US006639778B2

(12) United States Patent
Smith

(10) Patent No.: US 6,639,778 B2
(45) Date of Patent: Oct. 28, 2003

(54) FUSE PROTECTED SHUNT REGULATOR HAVING IMPROVED CONTROL CHARACTERISTICS

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/201,765

(22) Filed: Jul. 22, 2002

(65) Prior Publication Data

US 2002/0181181 A1 Dec. 5, 2002

Related U.S. Application Data

(62) Division of application No. 09/680,703, filed on Oct. 6, 2000.

(51) Int. Cl.[7] ........................................ H02H 3/08
(52) U.S. Cl. ........................................ 361/104; 361/54
(58) Field of Search ........................ 361/104, 18, 54, 361/55; 323/282

(56) References Cited

U.S. PATENT DOCUMENTS 4,104,581 A * 8/1978 Arkosy ........................ 324/51
4,544,876 A * 10/1985 Bailey et al. ............... 323/282
4,562,454 A * 12/1985 Schultz et al. ................ 357/51
5,554,924 A * 9/1996 McMahon et al. .......... 323/229
5,583,463 A * 12/1996 Merritt ....................... 327/526
5,789,970 A * 8/1998 Denham ..................... 327/525
5,790,360 A * 8/1998 Ryan .......................... 361/111
5,838,076 A * 11/1998 Zarrabian et al. ........... 307/115
5,914,662 A * 6/1999 Burleigh ..................... 340/635
6,169,393 B1 * 1/2001 Hashimoto .................. 323/354
6,300,750 B1 * 10/2001 Oglesbee et al. ........... 323/266
6,490,142 B1 * 12/2002 Smith ......................... 361/104

* cited by examiner

*Primary Examiner*—Brian Sircus
*Assistant Examiner*—Zeev Kitov
(74) *Attorney, Agent, or Firm*—Merchant & Gould P.C.; John W. Branch

(57) ABSTRACT

A shunt regulator circuit and method for protecting the circuit having a plurality of fuses parallely arranged in a bank so that lower rated fuse can be used while improving the control characteristics of activating the fuse elements. The circuit operates in one of two modes, a shunt regulator mode and a fuse activation mode. In the shunt regulator mode, a feedback circuit prevents any fuse that has blown open form loading a feedback signal to the regulator amplifier of the circuit. In fuse activation mode, each fuse is selectively activated so that a large amount of current is caused to flow through the fuse element until it blows open. This continues for each fuse element in the bank until the safety concern has been eliminated.

6 Claims, 2 Drawing Sheets

FUSE PROTECTED SHUNT REGULATOR HAVING IMPROVED CONTROL CHARACTERISTICS

This application is a divisional of application Ser. No. 09/680,703, filed Oct. 6, 2000, which application(s) are incorporated herein by reference.

FIELD OF THE INVENTION

The present invention is directed to a method and apparatus for improving the operation of a shunt regulator and, more particularly, to a method and apparatus for improving the control characteristics of a fuse protected shunt regulator.

BACKGROUND OF THE INVENTION

Fuses are very important in protecting circuitry from overload conditions. They are designed to blow open at predetermined current levels and are selected based upon safety specifications designated for a particular circuit. A disadvantage associated with fuses is the lack of precise control over the activation of the fuse. The activation of a fuse does not occur within a narrow range of currents. Thus, the maximum hold current of a fuse could be substantially lower than the current required to open the fuse in a desired time period. The activation of a fuse is related to the thermal capacity of the fuse material and packaging and is measured in units of $Amp^2$ sec ($I^2t$). FIG. 1 is a graph illustrating a typical fuse activation profile for a fuse from a first batch and a fuse from a second batch. It can be seen from this graph that the range of currents that can activate the fuse is not narrow.

It is thus desirable to provide a fuse protected circuit that offers improved controllability over the activation of the fuse. In addition, it is desirable to provide a fuse protected circuit that offers redundancy in case of point defects in the fuse control circuitry.

In addition, fuse protected circuits are controlled by control circuits typically composed of switching circuitry. The control circuit needs to monitor the output voltage of the switching circuitry to determine whether a fuse has blown or not. This can be particularly important in feedback circuits where it is not desirable to allow open fuse nodes to load the feedback signal. Thus, it is desirable to provide a feedback circuit for a fuse protected circuit that isolates open fuse nodes.

SUMMARY OF THE INVENTION

According to a first aspect of the invention there is provided a shunt regulator. The shunt regulator includes a plurality of fuse elements, a plurality of pass elements an amplifier and a feedback means. Each fuse element has a first node and a second node wherein the second node of each fuse element is operatively coupled together. Each pass element has an input and an output wherein the first node of each fuse is operatively coupled to the output of one of the plurality of pass elements so that each one of the plurality of pass elements has an independent fuse associated therewith. The amplifier has an input and an output, the output of the amplifier coupled to the inputs of the plurality of pass elements. The feed back means is coupled to the first node of each fuse element for supplying a feed back signal to the input of the amplifier wherein the feed back signal is composed of the output from at least one first node that has an intact fuse associated therewith.

According to a second aspect of the invention there is provided a shunt regulator. The shunt regulator includes a plurality of fuse elements, a plurality of pass elements, an amplifier and a feedback circuit. Each fuse element has a first node and a second node wherein the second node of each fuse element are operatively coupled together. Each pass element has an input and an output wherein the first node of each fuse of operatively coupled to the output of one of the plurality of pass elements so that each one of the plurality of pass elements has an independent fuse associated therewith. The amplifier has an input and an output, the output of the amplifier coupled to the inputs of the plurality of pass elements. The feed back circuit is operatively coupled between the first nodes of each fuse element and the input of the amplifier. The feed back circuit isolates any node that has a blown fuse associated therewith from the input of the amplifier.

According to a third aspect of the invention there is provided a method of protecting a shunt regulator circuit using a bank of fuses having a plurality of fuse elements arranged in parallel wherein each fuse element has a first end operatively coupled to a power source or load and a second end operatively coupled to one of a plurality of nodes. The method includes the steps of: (a) operating the circuit in a shunt regulator mode; and (b) switching the mode of operation of the circuit if a safety concern has been detected to a fuse activation mode, the fuse activation mode includes the steps of detecting a voltage at each of the plurality of nodes, isolating any node that has a blown fuse associated therewith from a feedback signal and sequentially activating each fuse in the bank of fuses that has an intact fuse associated therewith until the safety concern is eliminated.

According to a fourth aspect of the invention there is provided a shunt regulator circuit having a bank of fuses to protect the circuit wherein the bank of fuses has a plurality of fuse elements arranged in parallel wherein each fuse element has a first end operatively coupled to a power source or load and a second end operatively coupled to one of a plurality of nodes. The circuit includes means for operating the circuit in a shunt regulator mode; and means for switching the mode of operation of the circuit if a safety concern has been detected to a fuse activation mode, the fuse activation mode comprising the step of sequentially activating each fuse in the bank of fuses until the safety concern is eliminated.

A more complete appreciation of the present invention and its improvements can be obtained by reference to the accompanying drawings, which are briefly summarized below, to the following detailed description of the presently preferred embodiments of the invention, and to the appended claims.

DETAILED DESCRIPTION OF THE PREFERRED EMBODIMENTS

Figure 1:
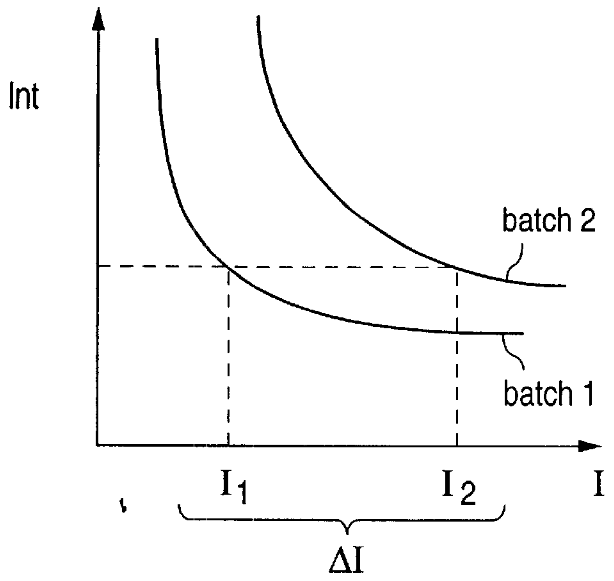
FIG. 1 is a graph illustrating a typical fuse activation profiles.
Figure 2:
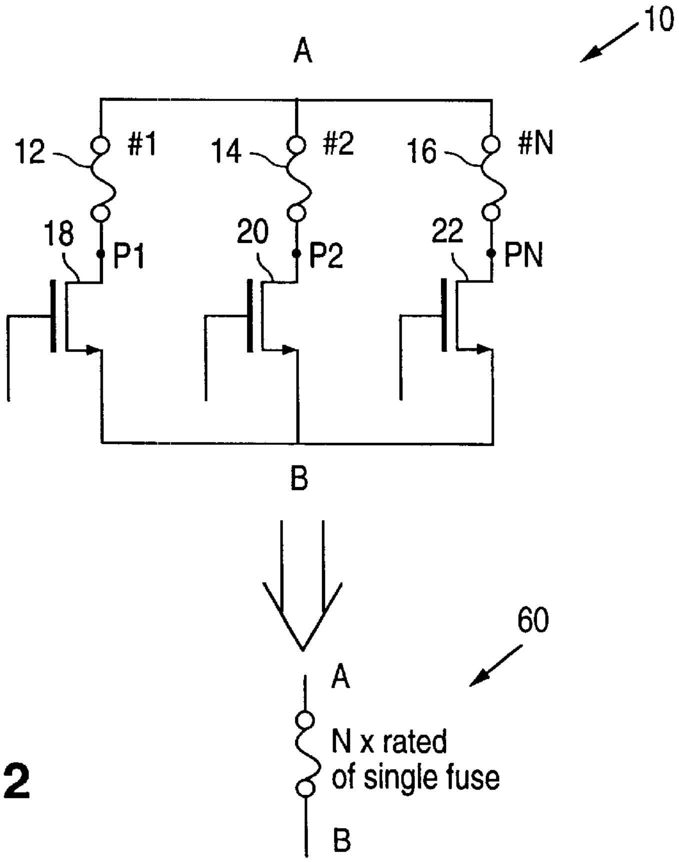
FIG. 2 is an electrical schematic of a parallel fuse circuit.

FIG. 2 is an electrical schematic of a parallel fuse circuit. The parallel fuse circuit 10 includes multiple fuse elements 12–16 and multiple switches 18–22. Each fuse element is electrically coupled to a distinct switch. Thus, fuse element 12 is electrically coupled to switch 18, fuse element 14 is electrically coupled to switch 20 and fuse element 16 is electrically coupled to switch 22. Any number (N) of fuses may be coupled in parallel as shown. Circuit 60 shows one fuse element couple between terminals A and B. Circuit 10 is meant to replace circuit 60 while offering the benefits of redundancy and improved controllability by using lower rated fuses than would be associated with circuit 60. For example, the fuse in circuit 60 may have a hold current rating of 3 Amps. This hold current rating is the maximum value at which the fuse will not blow open. However, as previously mentioned, the minimum and maximum hold current of a fuse may be substantially broad for a desired time period. This leads to a lack of control, and precision in using fuses. It is more desirable to select fuses that will be substantially guaranteed to blow open at a desired current level on a relatively short amount of time. Thus, to provide greater control over the activation of a fuse, a group of fuses having a lower rating than that of a single fuse are combined in parallel as shown in FIG. 1. For example, it may be desired to employ a fuse that has a maximum hold current of 3 Amperes. In use, however, it may take more than 3 Amperes of current flowing through the fuse to blow the fuse open in the desired amount of time, i.e., activate the fuse. By using multiple, lower rated fuses combined in parallel, each fuse can be activated in sequence forcing the load current to funnel through each single lower rate fuse. Because lower rated fuses are used, the ability to cause the fuse to blow at a particular amperage is substantially guaranteed. In addition, by providing multiple fuses, redundancy is provided. Thus, if switch 18 is defective, for example, and cannot cause the activation of fuse 12, the current can be rerouted by activating a switch associated with another fuse to run the current through that fuse. A sequence controller is used to control the switches 18–22. The sequence controller needs to monitor the output voltages of the switches, i.e. points 24, 30, 36, so that it knows which fuses are open.

Figure 3:
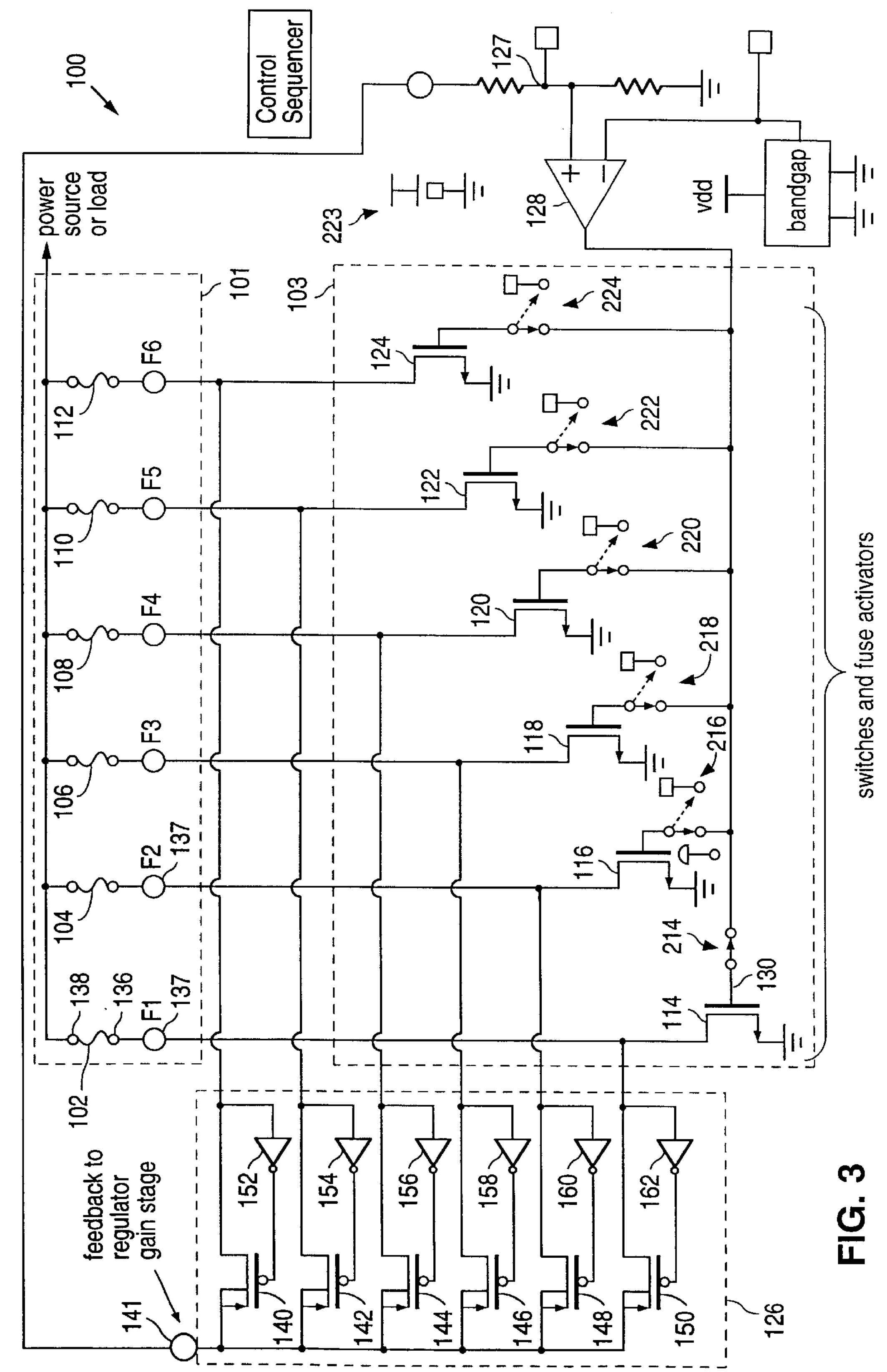
FIG. 3 is an electrical schematic of a fuse protected shunt regulator according to a preferred embodiment of the present invention.
Figure 2:
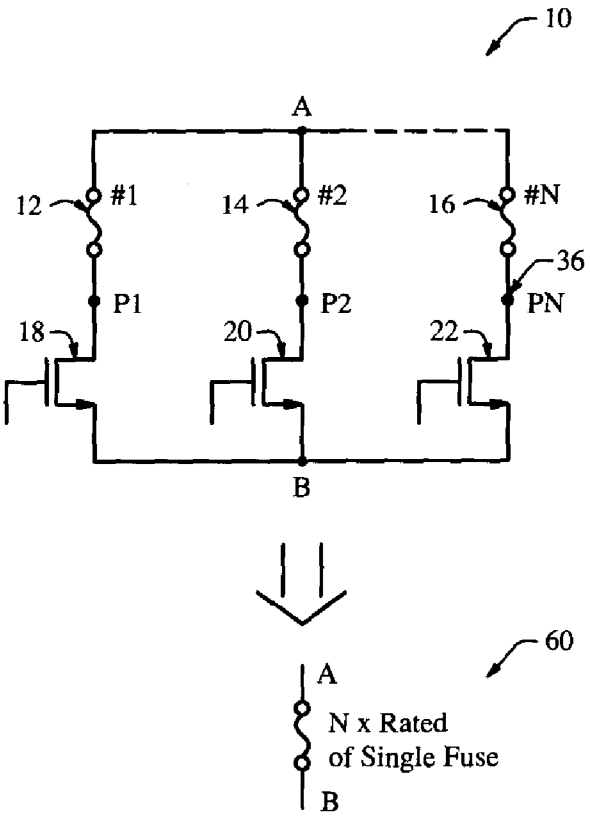
Figure 3:
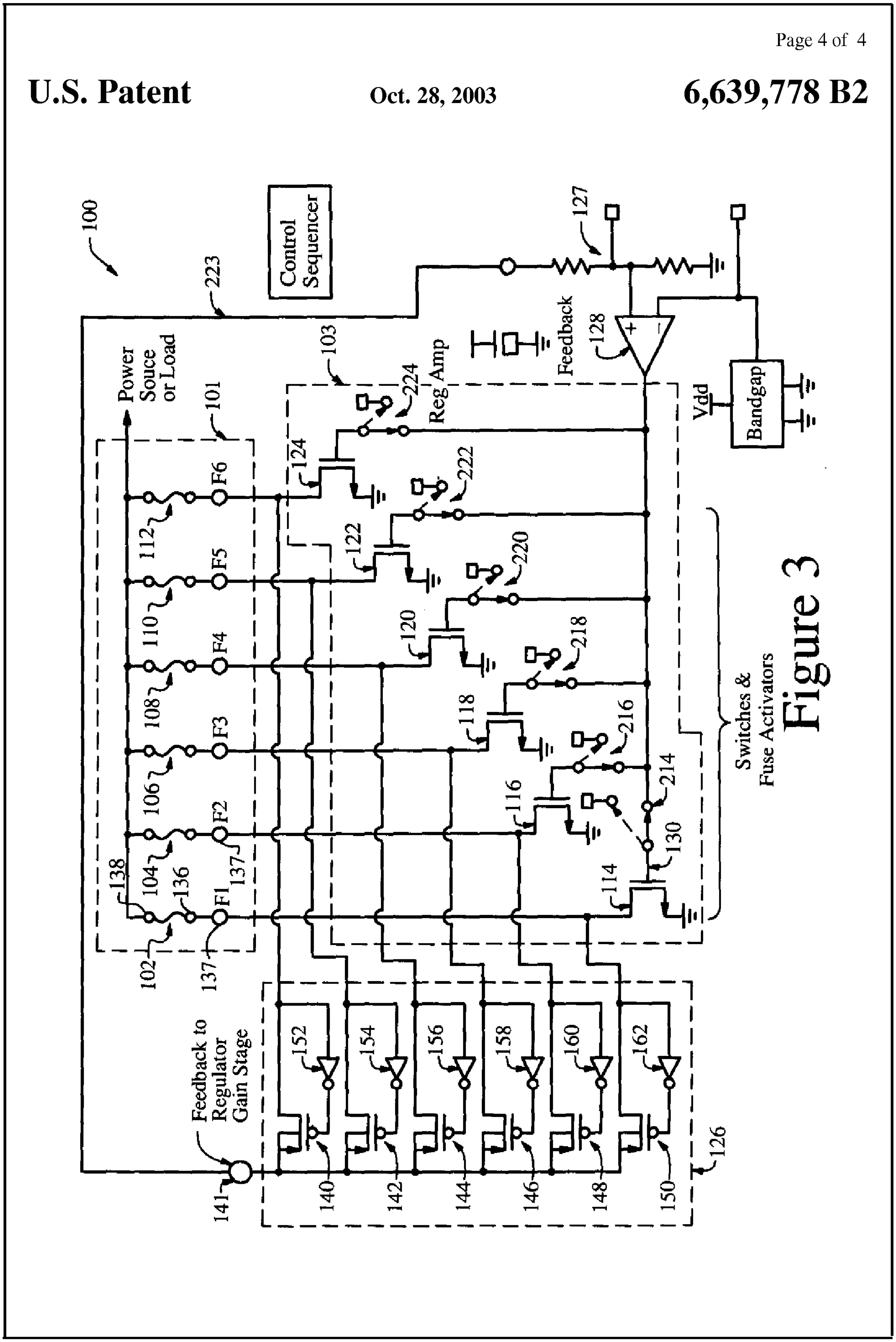

FIG. 3 is an electrical schematic of a fuse protected shunt regulator circuit 100 according to a preferred embodiment of the present invention. The circuit 100 includes a fuse bank 101 of parallely arranged fuse elements 102–112, a bank 103 of pass elements 114–124, first switches 214–224, a feed back circuit 126 and a regulator amplifier 128. Each fuse element 102–112 has a first terminal 136 and a second terminal 138. The second terminal 138 of each fuse element is coupled to either a power source (not shown) or a load (not shown). The first terminal 136 of each fuse element is electrically coupled to an output of a distinct pass element in the bank of pass elements 103 of a node F1–FN. Thus, fuse 102 is coupled to pass element 114 at node F1, fuse 104 is coupled to pass element 116 at node F2, etc. While this particular example is shown with six fuses the present invention may be used with any number of fuses and the present invention is not so limited. In a preferred embodiment, circuit 100 is an integrated circuit and each fuse element 102–112 is formed by a wire bond of the integrated circuit.

Feedback circuit 126 is formed by a plurality of second switches 140–150 and a plurality of inverters 152–162. A distinct second switch and inverter are associated with each node F1–F6. The output of the feedback circuit is coupled to feedback node 141. Thus, second switch 150 and inverter 162 are coupled to node F1, second switch 148 and inverter 160 are coupled to node F2, etc. As will be described in detail below, the feedback circuit 126 isolates any node F1–F6 that has a blown open fuse element associated therewith form feedback node 141.

The circuit 100 shown in FIG. 3 has two operational modes, a shunt regulator mode and a fuse activation mode. When the circuit is in its shunt regulator mode, switches 214–224 are in a closed position as shown in solid line in FIG. 3 so that the gate of each pass element 114–124 is electrically coupled to the output of the regulator amplifier 128. Assuming all of the fuse elements 102–112 are in tact, i.e. not blown open, the voltages at nodes F1–F6 are high. Thus each second switch 140–150 in the feedback circuit 126 is active through its associated inverter 152–162. The feedback at node 141 is thus composed of the output voltages at nodes F1–F6. The feedback signal at node 141 is fed back to the input of the regulator amplifier 128 and the circuit 100 acts as a shunt regulator.

If a safety condition is present as detected by the feedback signal to the amplifier, the circuit 100 is switched in operation to its fuse activation mode. In this mode, a control sequencer controls the operation of switches 214–224 so that each fuse is activated in sequence. Thus, control sequencer causes switch 214 to switch from its solid line position in FIG. 3 to its dashed line position. When the switch 214 is in its dashed line position, the gate of pass element 114 is uncoupled from the output of the regulator amplifier 128 and is now electrically coupled to a positive power supply 223. The power supply 223 causes the pass element 114 to turn on hard thereby drawing more current through its associated fuse element 102 than is being drawn through the other fuse elements 104–112. Once fuse element 102 blows open, the switch 214 is switched back to its solid line position and control sequencer causes switch 216 to switch to its dashed line position thereby coupling the gate of pass element 116 to the power supply 223 so that a large amount of current is drawn through fuse 106 to cause it to blow open. This continues until either all of the fuses 102–112 are blown open or the condition that caused the circuit 100 to switch to its fuse activation mode is eliminated.

Once the safety concern has been eliminated, the circuit can be switched back to its shunt regulator mode of operation. If a fuse such as fuse 102 was blown open during the fuse activation mode of operation, the voltage at node F1 is low and inverter 162 prevents the second switch 150 from turning on thereby isolating the voltage at node F1 from the feedback node 141.

By providing feedback circuit 126, if the condition that caused the circuit 100 to switch to its fuse activation mode occurs and only half of the fuse elements are blown open before the condition is eliminated, the circuit 100 is able to return to its shunt regulator mode since the feedback nodes associated with the blown open fuse elements are isolated from the feedback node 141 by feedback circuit 126. This prevents multiple open fuse elements from preventing the circuit 100 from operating in its shunt regulator mode.

Alternately, when circuit 100 is in its fuse activation mode, instead of keeping the gates of pass elements that are not being activated coupled to the output of the regulator amplifier 128, they may be coupled to ground to ensure that all of the current is being drawn though the fuse being activated. In addition, once a fuse has been activated, instead of recoup ling the gate of the associated pass element to the output of the amplifier 128, it may be coupled to ground.

In a preferred embodiment of the invention the pass elements 114–124 are NMOS FETS and the second switches 140–150 are PMOS FETS. Of course those of ordinary skill in the art will appreciate that other types of switching mechanisms may be used. In addition, while the fuse protected circuit has been described with reference to a shunt circuit, it may also be used in other types of circuits where control circuitry needs to know the output voltage of its switches, i.e. whether a switch is associated with a blown fuse, so that that output is isolated from the feedback signals.

The circuit arrangement of the present invention also provides for failsafe operation of the regulator even in the event of a random defect in any one of the pass elements 114–124, fuses 102–112 or switches 214–224 due to the redundancy of the circuit.

The above specification, examples and data provide a complete description of the manufacture and use of the invention. Since many embodiments of the invention can be made without departing from the spirit and scope of the invention, the invention resides in the claims hereinafter appended.

What is claimed is:

1. A method of protecting a shunt regulator circuit using a bank of fuses having a plurality of fuse elements arranged in parallel wherein each fuse element has a first end operatively coupled to a power source or load and a second end operatively coupled to one of a plurality of nodes, the method comprising the steps of:

(a) operating the circuit in a shunt regulator mode; and (b) switching the mode of operation of the circuit if a safety concern has been detected to a fuse activation mode, the fuse activation mode comprising the steps of detecting a voltage at each of the plurality of nodes, isolating any node that has a blown fuse associated therewith from a feed back signal and sequentially activating each fuse in the bank of fuses that has an intact fuse associated therewith until the safety concern is eliminated.

2. The method of claim 1 wherein step (a) further comprises the steps of (a)(i) coupling nodes having intact fuses elements associated therewith to an input of an amplifier; and (a)(ii) isolating nodes having a blown open fuse element associated therewith from the input of the amplifier.

3. The method of claim 1 further comprising a step (c) of repeating step (a) after the safety concern is eliminated.

4. A shunt regulator circuit having a bank of fuses to protect the circuit wherein the bank of fuses has a plurality of fuse elements arranged in parallel wherein each fuse element has a first end operatively coupled to a power source or load and a second end operatively coupled to one of a plurality of nodes, the circuit comprising:

means for operating the circuit in a shunt regulator mode; and means for switching the mode of operation of the circuit if a safety concern has been detected to a fuse activation mode, the fuse activation mode comprising the step of sequentially activating each fuse in the bank of fuses until the safety concern is eliminated.

5. The regulator of claim 4 further comprising means for switching the mode of operation of the circuit back to its shunt regulator mode once the safety concern is eliminated.

6. The regulator of claim 5 further comprising means for isolating fuses that have blown open from loading a feedback signal when the circuit is operating in its shunt regulator mode.

* * * * *

UNITED STATES PATENT AND TRADEMARK OFFICE

CERTIFICATE OF CORRECTION

PATENT NO. : 6,639,778 B2
DATED : October 28, 2003

INVENTOR(S) : Gregory Smith

It is certified that error appears in the above-identified patent and that said Letters Patent is hereby corrected as shown below:

The title page consisting of the illustrated figure should be deleted to appear as per attached title page.

The sheets of drawings should be deleted to appear as per attached sheets.

Title page,
Item [57], ABSTRACT,
Line 8, delete "form" and insert -- from --.

Column 1,
Line 51, after "elements" insert -- . --.
Lines 61, 62 and 63, delete "feed back" and insert -- feedback --.

Column 2,
Lines 11 and 13, delete "feed back" and insert -- feedback --.

Column 3,
Lines 40-41, delete "feed back" and insert -- feedback --.
Line 50, after "fuses" insert -- , --.

Column 4,
Line 5, delete "in tact" and insert -- intact --.
Line 58, delete "recoup ling" and insert -- recoupling --.
Line 61, delete "NMOS FETS" and insert -- NMOS FETs --.
Line 62, delete "PMOS FETS" and insert -- PMOSFETs --.

Column 5,
Line 28, delete "feed back" and insert -- feedback --.

Signed and Sealed this

Third Day of May, 2005

JON W. DUDAS
*Director of the United States Patent and Trademark Office*

(12) United States Patent
Smith

(10) Patent No.: US 6,639,778 B2
(45) Date of Patent: Oct. 28, 2003

(54) FUSE PROTECTED SHUNT REGULATOR HAVING IMPROVED CONTROL CHARACTERISTICS

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/201,765

(22) Filed: Jul. 22, 2002

(65) Prior Publication Data

US 2002/0181181 A1 Dec. 5, 2002

Related U.S. Application Data

(62) Division of application No. 09/680,703, filed on Oct. 6, 2000.

(51) Int. Cl.[7] .......... H02H 3/08
(52) U.S. Cl. .......... 361/104; 361/54
(58) Field of Search .......... 361/104, 18, 54, 361/55; 323/282

(56) References Cited

U.S. PATENT DOCUMENTS 4,104,581 A * 8/1978 Arkosy .......... 324/51
4,544,876 A * 10/1985 Bailey et al. .......... 323/282
4,562,454 A * 12/1985 Schultz et al. .......... 357/51
5,554,924 A * 9/1996 McMahon et al. .......... 323/229
5,583,463 A * 12/1996 Merritt .......... 327/526
5,789,970 A * 8/1998 Denham .......... 327/525
5,790,360 A * 8/1998 Ryan .......... 361/111
5,838,076 A * 11/1998 Zarrabian et al. .......... 307/115
5,914,662 A * 6/1999 Burleigh .......... 340/635
6,169,393 B1 * 1/2001 Hashimoto .......... 323/354
6,300,750 B1 * 10/2001 Oglesbee et al. .......... 323/266
6,490,142 B1 * 12/2002 Smith .......... 361/104

* cited by examiner

*Primary Examiner*—Brian Sircus
*Assistant Examiner*—Zeev Kitov
(74) *Attorney, Agent, or Firm*—Merchant & Gould P.C.; John W. Branch

(57) ABSTRACT

A shunt regulator circuit and method for protecting the circuit having a plurality of fuses parallely arranged in a bank so that lower rated fuse can be used while improving the control characteristics of activating the fuse elements. The circuit operates in one of two modes, a shunt regulator mode and a fuse activation mode. In the shunt regulator mode, a feedback circuit prevents any fuse that has blown open form loading a feedback signal to the regulator amplifier of the circuit. In fuse activation mode, each fuse is selectively activated so that a large amount of current is caused to flow through the fuse element until it blows open. This continues for each fuse element in the bank until the safety concern has been eliminated.

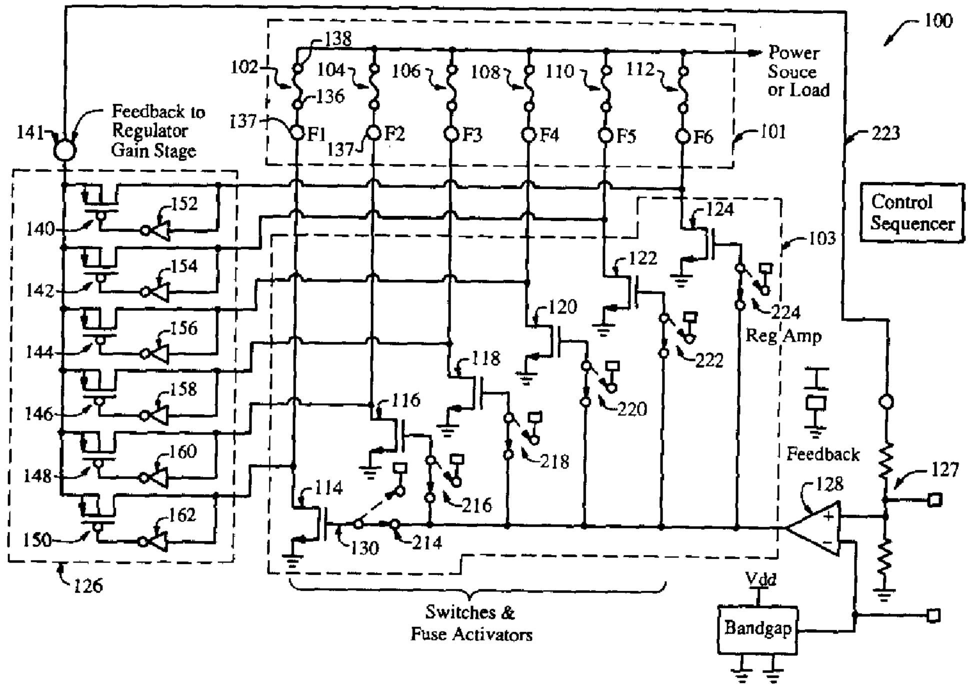

6 Claims, 2 Drawing Sheets